United States Patent
Kawasaki

(10) Patent No.: US 9,445,294 B2
(45) Date of Patent: Sep. 13, 2016

(54) TERMINAL SELECTION METHOD, NETWORK DEVICE, AND RADIO TERMINAL

(75) Inventor: Akira Kawasaki, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 102 days.

(21) Appl. No.: 14/127,845

(22) PCT Filed: Jun. 19, 2012

(86) PCT No.: PCT/JP2012/065634
§ 371 (c)(1),
(2), (4) Date: Dec. 19, 2013

(87) PCT Pub. No.: WO2012/176773
PCT Pub. Date: Dec. 27, 2012

(65) Prior Publication Data
US 2014/0133313 A1    May 15, 2014

(30) Foreign Application Priority Data

Jun. 20, 2011 (JP) ................................. 2011-136823

(51) Int. Cl.
*H04W 24/10* (2009.01)
*H04W 24/08* (2009.01)

(52) U.S. Cl.
CPC ............. *H04W 24/10* (2013.01); *H04W 24/08* (2013.01)

(58) Field of Classification Search
None
See application file for complete search history.

(56) References Cited

U.S. PATENT DOCUMENTS

| 2004/0203437 A1* | 10/2004 | Burch et al. ............... 455/67.11 |
| 2010/0279697 A1* | 11/2010 | Yang et al. .................. 455/446 |
| 2011/0183661 A1* | 7/2011 | Yi et al. ..................... 455/422.1 |
| 2012/0225657 A1 | 9/2012 | Watanabe et al. |

FOREIGN PATENT DOCUMENTS

| JP | 2004-228781 A | 8/2004 |
| WO | 2011/061990 A1 | 5/2011 |

OTHER PUBLICATIONS

International Search Report; PCT/JP2012/065634; Aug. 21, 2012.
3GPP TS 32.422 V10.2.1 (Jan. 2011), 3rd Generation Partnership Project; Technical Specification Group Services and System Aspects; Telecommunication management; Subscriber and equipment trace; Trace control and configuration management (Release 10), pp. 1-5.

(Continued)

*Primary Examiner* — Alex Skripnikov
(74) *Attorney, Agent, or Firm* — Studebaker & Brackett PC

(57) ABSTRACT

In one embodiment, a mobility management device MME selects a Logged MDT implementation terminal that should implement a measurement process by Logged MDT, from among a plurality of radio terminals UE in a mobile communication system 1 compatible with the Logged MDT defined in the 3GPP standards. The mobility management device MME stores camping history information in which information indicating a TA on which a radio terminal has camped is associated with information indicating a time period during which the radio terminal has camped on the TA, for each of the plurality of radio terminals UE. Then, the mobility management device MME selects, as the Logged MDT implementation terminal, a radio terminal having a relatively long camping time period corresponding to a measurement target area on which the measurement process is to be performed, from among the plurality of radio terminals UE.

6 Claims, 9 Drawing Sheets

(56) References Cited

OTHER PUBLICATIONS

3GPP TS 37.320 V0.7.0 (Jun. 2010), 3rd Generation Partnership Project; Technical Specification Group TSG RAN Universal Terrestrial Radio Access (UTRA) and Evolved Universal Terrestrial Radio Access (E-UTRA); Radio measurement collection for Minimization of Drive Tests (MDT); Overall description; Stage 2 (Release 10); pp. 1-15.

3GPP TSG-RAN WG2 #71, Huawei, "UE Selection & Configuration for MDT", Madrid, Spain, Aug. 23-27, 2010, R2-104669, pp. 1-4.

* cited by examiner

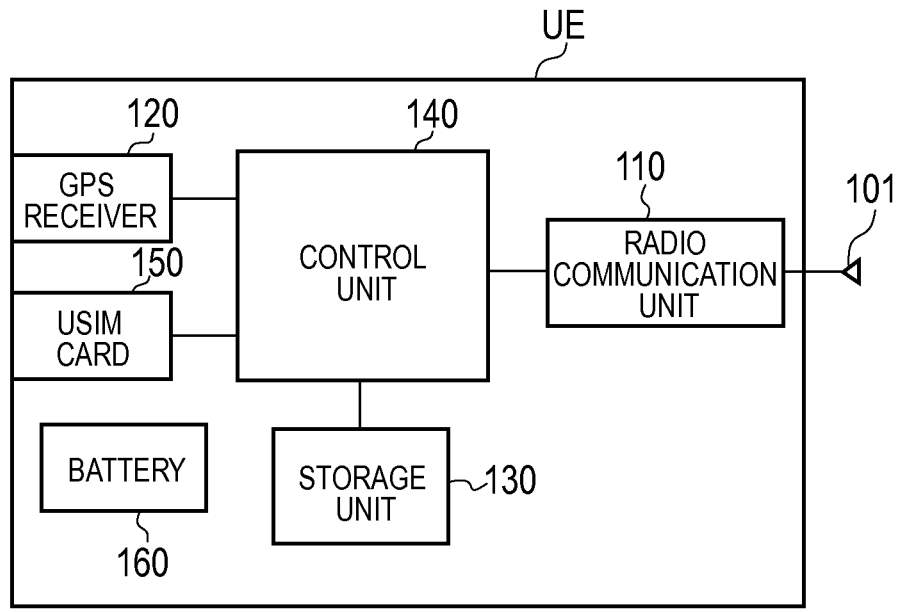
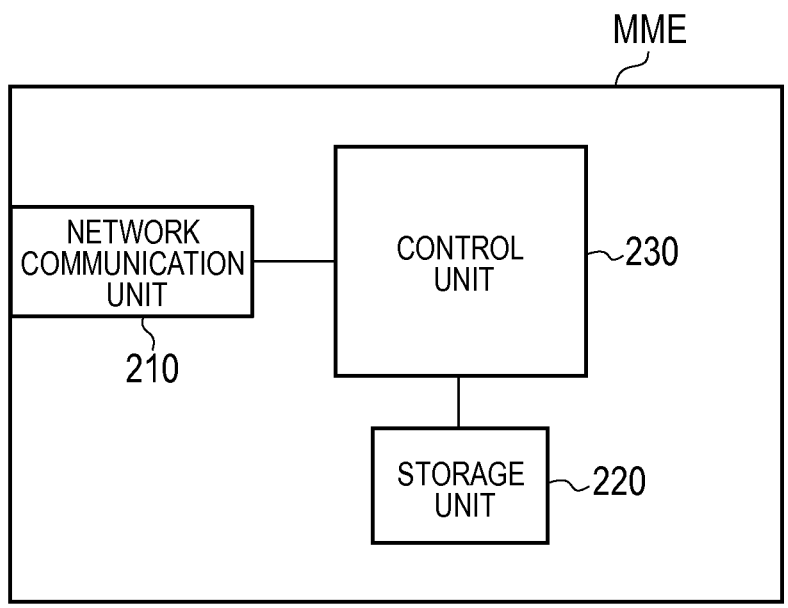

FIG. 4

CAMPING HISTORY INFORMATION

| IMSI OF TERMINAL A | TAI#0 | 2011/03/28 XX:XX:XX.xxx |
| --- | --- | --- |
| | TAI#9 | 2011/03/28 YY:YY:YY.yyy |
| | TAI#3 | 2011/03/28 ZZ:ZZ:ZZ.zzz |
| | TAI#2 | ... |
| IMSI OF TERMINAL B | TAI#0 | ... |
| | TAI#3 | ... |
| IMSI OF TERMINAL C | TAI#4 | ... |
| | TAI#6 | ... |
| | TAI#5 | ... |
| IMSI OF TERMINAL D | TAI#1 | ... |

FIG. 5

LOGGED MDT IMPLEMENTATION COUNT INFORMATION

| IMSI OF TERMINAL A | 5 TIMES |
| --- | --- |
| IMSI OF TERMINAL B | 4 TIMES |
| IMSI OF TERMINAL C | 5 TIMES |
| IMSI OF TERMINAL D | 3 TIMES |

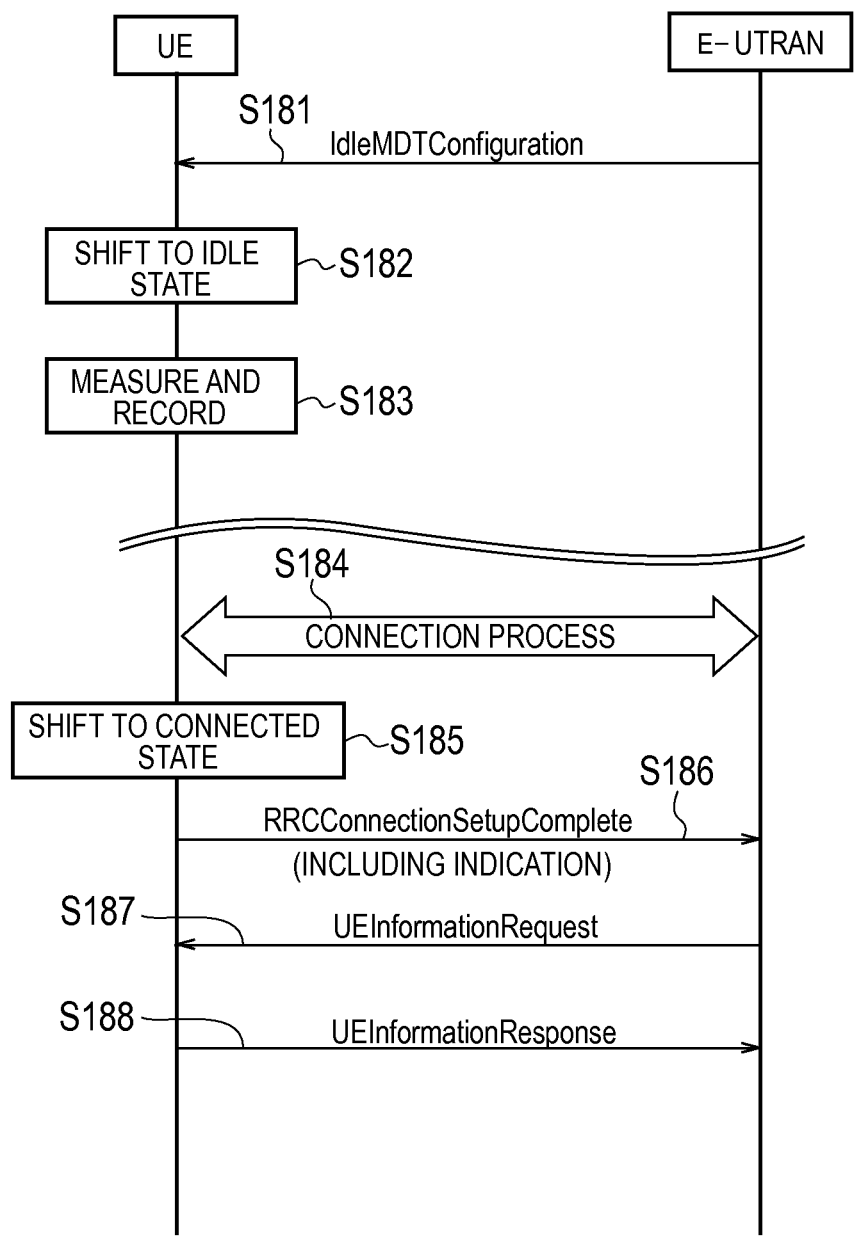

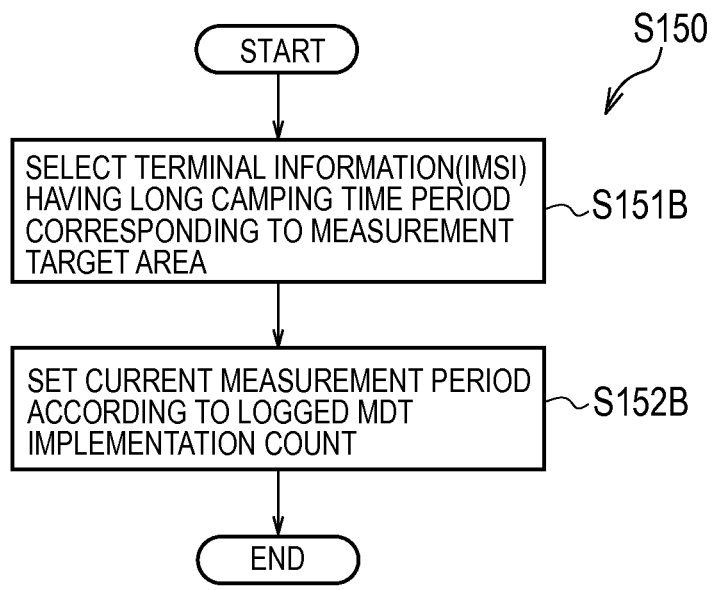
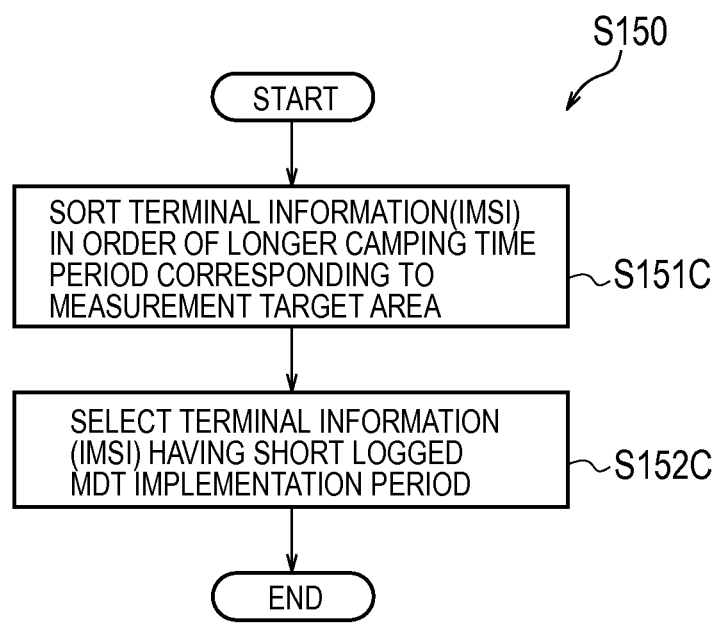

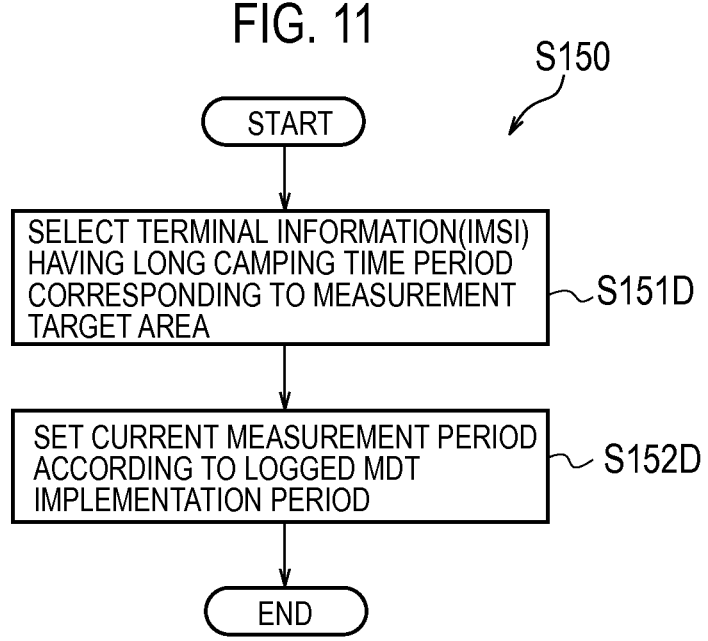
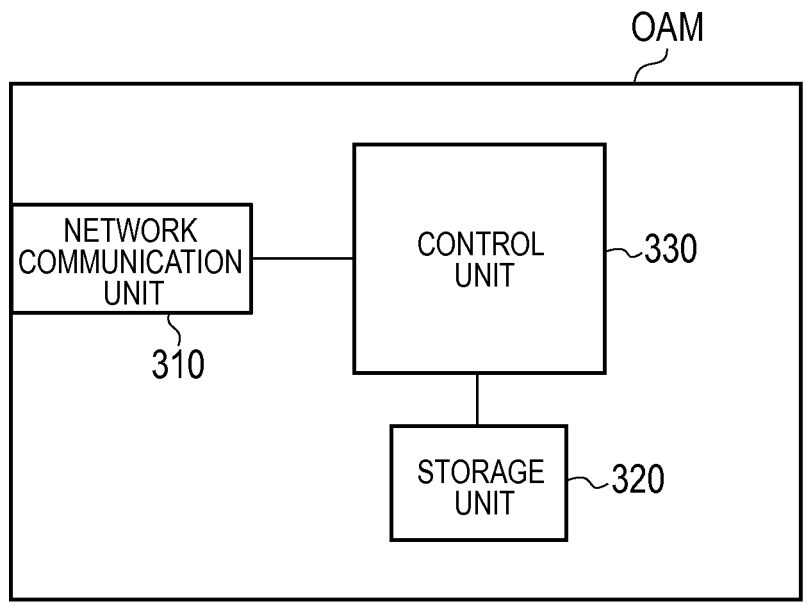

TERMINAL SELECTION METHOD, NETWORK DEVICE, AND RADIO TERMINAL

TECHNICAL FIELD

The present invention relates to a terminal selection method, a network device, and a radio terminal, in a mobile communication system compatible with MDT defined in the 3GPP standards.

BACKGROUND ART

In a mobile communication system, if a building is built in the vicinity of a base station, or if an installation status of another base station in the vicinity of the base station changes, the radio environment related to the base station changes. Therefore, conventionally, an operator performs a drive test of measuring a radio environment by using a measurement vehicle mounted thereon with a measurement equipment, and collecting a measurement result and location information.

Such a measurement and collection can, for example, contribute to the optimization of a setting at the base station; however, there is a problem of too many man-hours and high cost.

In this regard, according to 3GPP (3rd Generation Partnership Project) which is a project aiming to standardize a mobile communication system, a specification design of MDT (Minimization of Drive Test) is under way which is a technology for automation of the measurement and collection by using a radio terminal owned by a user (see Non Patent Literature 1).

As a type of the MDT, there is a memory-type MDT (hereinafter, appropriately referred to as "Logged MDT"). In the Logged MDT, a radio terminal in an idle state measures a radio environment according to a measurement parameter set from a network, and stores a result of the measurement, together with location information and time information, as measurement data. Then, the radio terminal transitions to a connected state (on-communication state), and thereafter, reports the measurement data to the network later.

PRIOR ART DOCUMENT

Non-Patent Document

Non-Patent Document 1: 3GPP Technical Specification TS 37.320 v0.7.0

SUMMARY OF THE INVENTION

However, there is a problem that in the current 3GPP standards, there is not defined a method of selecting a radio terminal (measurement implementation terminal) that should implement a measurement process by the MDT, and it is not possible to appropriately select the measurement implementation terminal.

Therefore, an object of the present invention is to provide a terminal selection method with which it is possible to appropriately select a radio terminal that should implement a measurement process by MDT, a network device thereof, and a radio terminal thereof.

To solve the above-described problems, the present invention includes the following features.

Firstly, a feature of a terminal selection method according to the present invention is summarized as a terminal selection method in which a network device (for example, a mobility management device MME or an operation administration and maintenance device OAM) selects a measurement implementation terminal that should implement a measurement process by MDT, from among a plurality of radio terminals (radio terminals UE), in a mobile communication system (mobile communication system 1) compatible with the MDT defined in the 3GPP standards, the method comprising: a storage step of storing camping history information in which information indicating an area on which the radio terminal has camped is associated with information indicating a time period during which the radio terminal has camped on the area, for each of the plurality of radio terminals; and a selection step of selecting, on the basis of the camping history information stored in the storage step, as the measurement implementation terminal, a radio terminal having a relatively long camping time period corresponding to a measurement target area on which the measurement process is to be performed, from among the plurality of radio terminals.

According to such a feature, on the basis of the camping history information, it is possible to select, as a measurement implementation terminal, a radio terminal highly likely to camp on a measurement target area, that is, a radio terminal highly likely to be capable of obtaining measurement data about a measurement target area, out of a plurality of radio terminals. Therefore, it is possible to effectively collect measurement data in a measurement target area.

Another feature of the terminal selection method according to the present invention is summarized in that in the above-described feature, the storage step comprises: a step of receiving tracking area update information transmitted from each of the plurality of radio terminals; and a step of updating the camping history information on the basis of the received tracking area update information.

According to such a feature, it is possible to store camping history information by utilizing tracking area update information, which is one of the existing signalings, and thus, it is possible to prevent the generation of a new signaling (that is, overhead) for storing the camping history information.

Another feature of the terminal selection method according to the present invention is summarized in that in the above-described feature, the storage step comprises a step of storing the camping history information in each of the plurality of radio terminals, and the selection step comprises a step of collecting the camping history information stored in each of the plurality of radio terminals.

According to such a feature, when the camping history information can be stored at the radio terminal side, it is possible to reduce a load at the network side. Further, as compared to a case where the camping history information is stored at the network side, it is possible to store the camping history information in a more minute area unit such as a cell unit, for example.

Another feature of the terminal selection method according to the present invention is summarized in that in the above-described feature, the terminal selection method further comprises a management step of managing the number of times that the measurement process has been implemented, for each of the plurality of radio terminals, wherein in the selection step, a radio terminal which has a relatively long camping time period corresponding to the measurement target area, and which has a relatively small number of times that the measurement process has been implemented, is selected as the measurement implementation terminal, on the basis of the camping history information stored in the storage step and the information managed in the management step.

According to such a feature, it is possible to select, as the measurement implementation terminal, a radio terminal that has implemented a measurement process by MDT for a small number of times, that is, a radio terminal having a relatively low load by MDT, and thus, it is possible to increase fairness between radio terminals (between users).

Another feature of the terminal selection method according to the present invention is summarized in that in the above-described feature, the terminal selection method further comprises a management step of managing a period during which the measurement process has been implemented, for each of the plurality of radio terminals, wherein in the selection step, a radio terminal which has a relatively long camping time period corresponding to the measurement target area, and which has a relatively short period during which the measurement process has been implemented, is selected as the measurement implementation terminal, on the basis of the camping history information stored in the storage step and the information managed in the management step.

According to such a feature, it is possible to select, as the measurement implementation terminal, a radio terminal having a short period during which a measurement process by MDT has been implemented, that is, a radio terminal having a relatively low load by MDT, and thus, it is possible to increase fairness between radio terminals (between users).

Another feature of the terminal selection method according to the present invention is summarized in that in the above-described feature, the terminal selection method further comprises a management step of managing the number of times that the measurement process has been implemented, for each of the plurality of radio terminals; and a setting step of setting a period during which the measurement process should be implemented to the measurement implementation terminal selected in the selection step, on the basis of information managed in the management step, wherein in the setting step, when the number of times that the measurement implementation terminal selected in the selection step has implemented the measurement process is large, the period during which the measurement process should be implemented is set to be shortened.

According to such a feature, when a measurement period for a radio terminal that has implemented a measurement process by MDT for a large number of times, that is, a radio terminal having a relatively high load by MDT, is shortened, it is possible to increase fairness between radio terminals (between users).

Another feature of the terminal selection method according to the present invention is summarized in that in the above-described feature, the method further comprises: a management step of managing a period during which the measurement process has been implemented, for each of the plurality of radio terminals; and a setting step of setting a period during which the measurement process should be implemented to the measurement implementation terminal selected in the selection step, on the basis of information managed in the management step, wherein in the setting step, when the period during which the measurement implementation terminal selected in the selection step has implemented the measurement process is long, the period during which the measurement process should be implemented is set to be shortened.

According to such a feature, when a measurement period for a radio terminal having a long period during which a measurement process by MDT has been implemented, that is, a radio terminal having a relatively low load by MDT, is shortened, it is possible to increase fairness between radio terminals (between users).

A feature of a network device according to the present invention is a network device that selects a measurement implementation terminal that should implement a measurement process by MDT, from among a plurality of radio terminals, in a mobile communication system compatible with the MDT defined in the 3GPP standards, the network device comprising: a selection unit that selects, as the measurement implementation terminal, a radio terminal having a relatively long camping time period corresponding to a measurement target area on which the measurement process is to be performed, from among the plurality of radio terminals, on the basis of camping history information obtained by associating information indicating an area on which the radio terminal has camped for each of the plurality of radio terminals with information indicating a time period during which the radio terminal has camped on the area.

A feature of a radio terminal according to the present invention is a radio terminal of a mobile communication system compatible with MDT defined in the 3GPP standards, comprising: a notification unit that notifies the network device of camping history information obtained by associating information indicating an area on which the radio terminal has camped with information indicating a time period during which the radio terminal has camped on the area, in order for a network device to select a measurement implementation terminal which should perform a measurement process by the MDT.

BRIEF DESCRIPTION OF THE DRAWINGS

FIG. 2 is a block diagram of a radio terminal.

FIG. 3 is a block diagram of a mobility management device.

FIG. 4 is a block diagram showing a configuration example of a camping history information.

FIG. 5 is a diagram showing a configuration example of Logged MDT implementation count information.

FIG. 8 is an operation sequence chart when Logged MDT is implemented.

FIG. 9 is a process flowchart of a terminal selection process according to a first modification of the first embodiment.

FIG. 10 is a process flowchart of a terminal selection process according to a second modification of the first embodiment.

FIG. 11 is a process flowchart of a terminal selection process according to a third modification of the first embodiment.

FIG. 12 is a block diagram of an operation administration and maintenance device OAM.

DESCRIPTION OF THE EMBODIMENT

Figure 1:
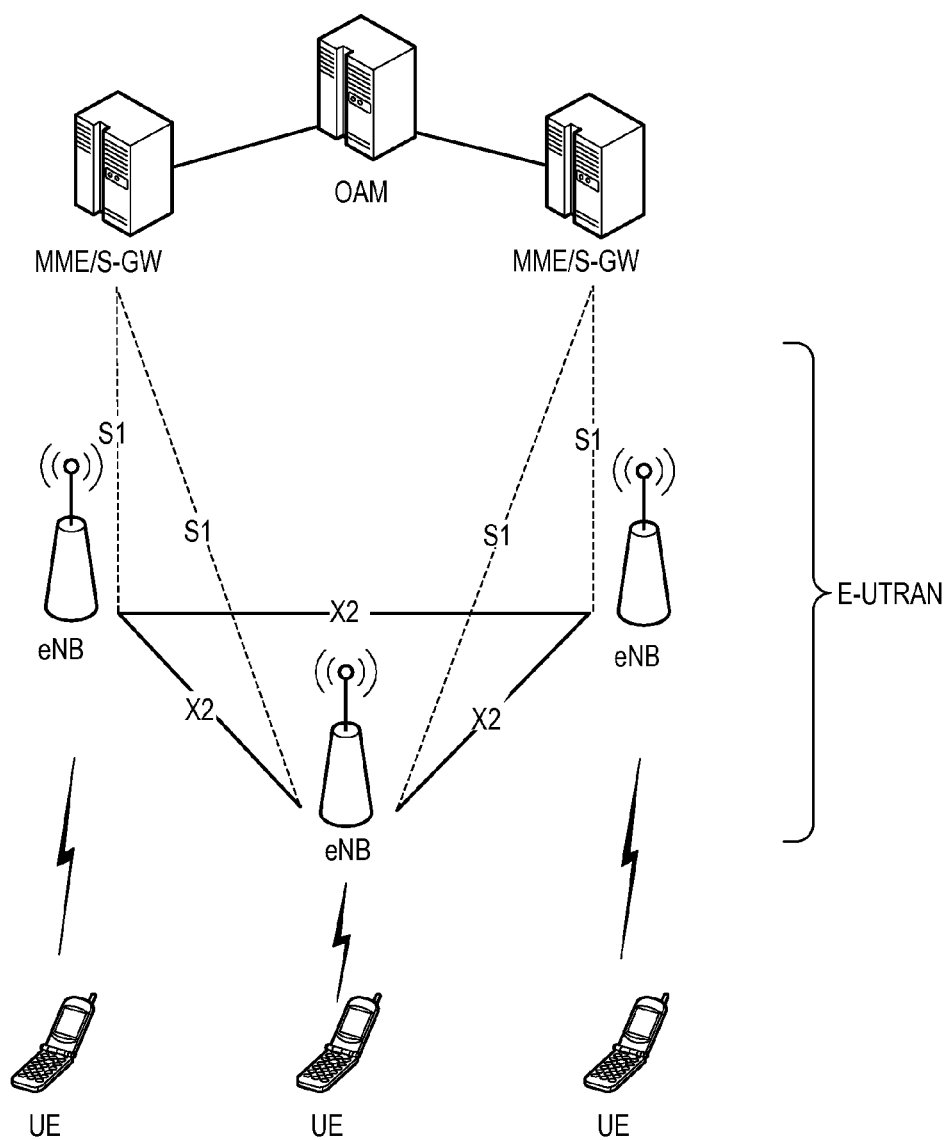
FIG. 1 is a diagram showing an entire configuration of a mobile communication system according to a first embodiment to a third embodiment.

A first embodiment through a third embodiment and other embodiments of the present invention are explained below with reference to drawings. In the following embodiments, through the drawings, same or similar components are assigned the same or similar reference numerals.

[First Embodiment]

(Configuration of Mobile Communication System)

FIG. 1 is a diagram showing an entire configuration of a mobile communication system 1 according to the present embodiment. The mobile communication system 1 according to the present embodiment is configured based on LTE (Long Term Evolution) or LTE-Advanced, whose specifications are stipulated in 3GPP, and supports the above-described Logged MDT.

As shown in FIG. 1, the mobile communication system 1 includes a plurality of radio terminals UE, a plurality of base stations eNB, a plurality of mobility management devices MME/gateway devices S-GW, and an operation administration and maintenance device OAM.

Each radio terminal UE is a transportable radio communication device belonging to a user. The radio terminal UE is configured to be connected to the base station eNB to enable execution of communication with a communication partner via the base station eNB. A state where the radio terminal UE is during execution of communication is called a connected state, and a state where the radio terminal UE is during standby is called an idle state.

Each base station eNB is a fixed radio communication device set up by an operator, and is configured to perform radio communication with the radio terminal UE. Each base station eNB communicates with another base station eNB and communicates with the mobility management device MME/gateway device S-GW via a backhaul. The plurality of base stations eNB configure E-UTRAN (Evolved-UMTS Terrestrial Radio Access Network) which is a radio access network.

Each base station eNB forms one or a plurality of cells, that is, the smallest unit of a radio communication area.

As a result of movement, the radio terminal UE switches the camping cells. Switching cells when the radio terminal UE is in a connected state is called a handover, and switching cells when the radio terminal UE is in an idle state is called a cell reselection.

In the mobile communication system 1, one tracking area (TA) is configured by one or a plurality of cells. The TA denotes an area unit in which location registration and paging are performed. The radio terminal UE transmits TAU Request, that is, a tracking area update request, to the E-UTRAN, when it is detected that the camping TA is switched.

The mobility management device MME is configured to manage the TA on which the radio terminal UE camps and to perform various types of mobility managements for the radio terminal UE. In the present embodiment, the mobility management device MME corresponds to a network device that selects, from among a plurality of radio terminals UE, a Logged MDT implementation terminal that should implement a measurement process by Logged MDT.

The gateway device S-GW is configured to perform transfer control of user data that is transmitted and received by the radio terminal UE.

The operation administration and maintenance device OAM is a server device set up by an operator, and is configured to perform operation administration and maintenance of the E-UTRAN.

The base station eNB to which the radio terminal UE is connected transmits, to the radio terminal UE, Idle MDT Configuration, that is, a message for setting the Logged MDT to the radio terminal UE, in response to an instruction from the mobile management device MME or the operation administration and maintenance device OAM.

The radio terminal UE set so that Logged MDT is performed measures and records (logs) a received signal state from the E-UTRAN in an idle state, transitions from the idle state to the connected state, and then, reports the measurement data to the E-UTRAN.

The received signal state refers to the reference signal received power (RSRP) and reference signal received quality (RSRQ), for example. The measurement data includes location information at the time of measurement and time information at the time of measurement, in addition to a measurement result of a received signal state. The location information is GPS location information when the radio terminal UE has a GPS function, and is RF fingerprint information when the radio terminal UE does not have the GPS function.

The base station eNB having received measurement data from the radio terminal UE transfers the received measurement data to the operation administration and maintenance device OAM. If the operation administration and maintenance device OAM discovers a coverage problem on the basis of the measurement data acquired in this way, the operation administration and maintenance device OAM performs network optimization for notifying an operator of the discovered coverage problem or solving the discovered coverage problem.

(Configuration of Radio Terminal UE)

Next, the configuration of the radio terminal UE will be described. FIG. 2 is a block diagram of the radio terminal UE. In the present embodiment, a configuration where the radio terminal UE has the GPS function will be described.

As shown in FIG. 2, the radio terminal UE includes an antenna 101, a radio communication unit 110, a GPS receiver 120, a storage unit 130, a control unit 140, a USIM (Universal Subscriber Identification Module) card 150, and a battery 160.

The antenna 101 is used for transmitting and receiving a radio signal. The radio communication unit 110 is configured by using a radio frequency (RF) circuit or a baseband (BB) circuit, for example, and is configured to perform radio communication via the antenna 101.

For transmission, the radio communication unit 110 performs coding and modulation of a transmitted signal that is input from the control unit 140, performs up-converting and amplification for the modulated signal, and then outputs the amplified signal to the antenna 101.

For reception, the radio communication unit 110 performs amplification and down-converting of a received signal that is input from the antenna 101, performs demodulation and decoding for the converted signal, and then outputs the decoded signal to the control unit 140.

Further, the radio communication unit 110 measures RSRP/RSRQ of a reference signal received by the radio communication unit 110 from the E-UTRAN, and outputs the measured RSRP/RSRQ to the control unit 140.

The GPS receiver 120 receives a signal from a GPS satellite, and outputs the GPS location information to the control unit 140.

The USIM card 150 stores IMSI (International Mobile Subscriber Identity) that is identification information for identifying a user (subscriber) of the radio terminal UE. Generally, the USIM card 150 is used while being inserted into a specific radio terminal UE, and thus, in the present embodiment, the radio terminal UE is identified by the IMSI.

The storage unit 130 is configured by using a memory, for example, and stores various types of information that is used for control and the like of the radio terminal UE. The storage unit 130 stores identification information (TAI) of TA on which the radio terminal UE camps.

The control unit 140 is configured by using a CPU, for example, and controls various types of functions provided in the radio terminal UE.

In the present embodiment, the control unit 140 compares the TAI stored in the storage unit 130 with new TAI included in the radio signal received by the radio communication unit 110 from the E-UTRAN. Then, the control unit 140 controls the radio communication unit 110 so that the TAU Request including the new TAI is transmitted to the E-UTRAN, when each TAI is inconsistent to each other. At this time, the control unit 140 controls so that the IMSI stored in the USIM card 150 is included in the TAU Request and transmitted.

Further, when the radio communication unit 110 receives the Idle MDT Configuration from the E-UTRAN, the control unit 140 stores each parameter included in the Idle MDT Configuration into the storage unit 130. These parameters include a measurement target, a measurement trigger, a measurement target area, and a measurement period.

The measurement target is to designate a frequency band on which the measurement relating to the Logged MDT should be performed.

The measurement trigger is to designate a trigger (opportunity) upon which the measurement relating to the Logged MDT should be performed. The measurement trigger may designate a cyclic measurement.

The measurement target area is to designate, in a cell unit or a TA unit, an area on which the measurement relating to the Logged MDT should be performed. In the present embodiment, the measurement target area is mainly designated in a TA unit.

The measurement period is to designate a period during which the measurement relating to the Logged MDT should be performed.

When the control unit 140 receives the Idle MDT Configuration and then transitions to an idle state, the control unit 140 performs a measurement process by the Logged MDT in accordance with each parameter stored in the storage unit 130.

In particular, in a case where the radio terminal UE camps on the measurement target area within the measurement period, when an instance according to the measurement trigger occurs, the control unit 140 controls so that a measurement for the frequency band which is the measurement target is performed. Then, the control unit 140 acquires the location information and the time information at the time of performing the measurement, creates measurement data in which the measurement result, the location information, and the time information are corresponded, and stores the created measurement data in the storage unit 130.

The control unit 140, in a case of the storage unit 130 storing the measuring data and upon completion of movement from the idle state to the connected state, controls so that Indication indicating that the measurement data is held is included in RRC Connection Setup Complete, that is, a message indicating that the movement from the idle state to the connected state is completed, and the resultant Indication is transmitted to the E-UTRAN. Then, when the transmission of the measurement data is requested from the E-UTRAN, the control unit 140 transmits the measurement data stored in the storage unit 130 to the E-UTRAN.

(Configuration of Mobility Management Device MME)

Next, the configuration of the mobility management device MME will be described. FIG. 3 is a block diagram of the mobility management device MME.

As shown in FIG. 3, the mobility management device MME includes a network communication unit 210, a storage unit 220, and a control unit 230.

The network communication unit 210 communicates with each base station eNB included in the E-UTRAN and communicates with the operation administration and maintenance device OAM.

The storage unit 220 is configured by using a memory, for example, and stores various types of information used for control and the like of the mobility management device MME. In the present embodiment, the storage unit 220 stores camping history information and Logged MDT implementation count information.

FIG. 4 is a block diagram showing a configuration example of the camping history information.

As shown in FIG. 4, in the camping history information, the TAI, that is, information indicating TA on which a radio terminal has camped is associated with a camping start time, that is, information indicating a time period during which the radio terminal camped on the TA, for each IMSI of a plurality of radio terminals A to D.

For example, it is stored that the radio terminal A starts camping on the TA indicated by TAI#0 at XX:XX:XX on Mar. 28, 2011, starts camping on the TA indicated by TAI#9 at YY:YY:YY on Mar. 28, 2011, and starts camping on the TA indicated by TAI#3 at ZZ:ZZ:ZZ on Mar. 28, 2011.

In this case, if the radio terminal A transitions (moves) from the TA indicated by TAI#0 to the TA indicated by TAI#9, then the camping time period on the TA indicated by TAI#0 can be evaluated by a difference between XX:XX:XX and YY:YY:YY.

FIG. 5 is a diagram showing a configuration example of the Logged MDT implementation count information.

As shown in FIG. 5, the Logged MDT implementation count information is that in which the number of times that the Logged MDT has been implemented is associated with each IMSI of the plurality of radio terminals A to D. For example, for the IMSI of the radio terminal A, it is stored that five Logged MDT operations have been implemented.

The control unit 230 is configured by using a CPU, for example, and controls various types of functions provided in the mobility management device MME.

As shown in FIG. 3, the control unit 230 updates the camping history information on the basis of the TAU Request received by the network communication unit 210. The TAU Request is transmitted from the radio terminal UE, and relayed to the mobility management device MME by the base station eNB.

The TAU Request includes the IMSI of the radio terminal UE that transmitted the TAU Request and the TAI of the TA on which the radio terminal UE newly camped. The control unit 230 stores, into the storage unit 220, the IMS and the TAI included in the TAU Request received by the network communication unit 210, while the IMS and the TAI are associated with each other and stores, into the storage unit 220, the camping start time indicating the time at which the network communication unit 210 received the TAU Request, while the camping start time is associated with the IMS and TAI.

It is noted that when the time information is included in the TAU Request, the time information may be stored as the camping start time. Further, more recent camping history information is effective, and thus, the control unit 230 preferably deletes the camping history information that passed a certain period (one day or one week).

The control unit 230 manages the Logged MDT implementation count information. In detail, when a certain radio terminal UE is decided as the Logged MDT implementation terminal, and then, the Logged MDT is implemented, the control unit 230 increments (adds one to) the Logged MDT implementation count corresponding to the IMSI of the radio terminal UE.

It is noted that when it is possible to obtain the information relating to the radio terminal UE that implemented the Logged MDT from the operation administration and maintenance device OAM, the control unit 230 may update the Logged MDT implementation count information on the basis of the information. Further, the Logged MDT implementation count is limited in count, and thus, the control unit 230 preferably deletes the Logged MDT implementation count information at a timing at which a certain period (one day or one week) passed or a timing at which the radio terminals UE that implemented the Logged MDT have substantially completed a cycle.

When it is decided that the Logged MDT is to be implemented for a certain measurement target area or when it is instructed from the operation administration and maintenance device OAM to implement the Logged MDT for a certain measurement target area, the control unit 230 selects the Logged MDT implementation terminal on the basis of the measurement target area, the camping history information stored in the storage unit 220, and the Logged MDT implementation count information.

In detail, the control unit 230 selects, as the Logged MDT implementation terminal, the radio terminal UE which has a relatively long camping time period corresponding to the measurement target area, and which has a relatively small number of times that the Logged MDT has been implemented, out of a plurality of radio terminals A to D.

When the control unit 230 selects the Logged MDT implementation terminal, the control unit 230 transmits, to the Logged MDT implementation terminal via the E-UTRAN, the Idle MDT Configuration for setting the Logged MDT.

(Operation of Mobile Communication System)

Figure 6:
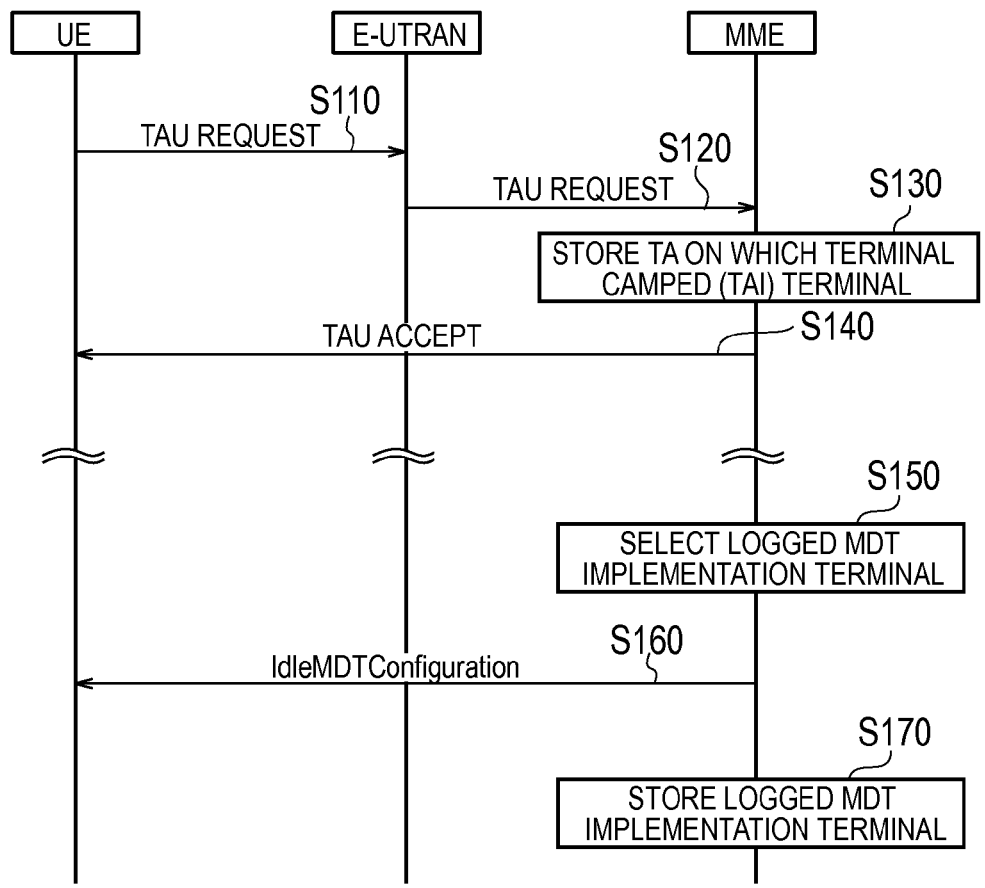
FIG. 6 is an operation sequence chart according to an operation for selecting a Logged MDT implementation terminal in a first embodiment.

FIG. 6 is an operation sequence chart according to an operation for selecting the Logged MDT implementation terminal in the first embodiment.

As shown in FIG. 6, in step S110, the radio terminal UE, after detecting the camping TA being switched, transmits, to the E-UTRAN, the TAU Request for notifying that the TA has been switched. The E-UTRAN receives the TAU Request. As described above, the TAU Request includes the IMSI of the radio terminal UE, and the TAI of the TA on which the radio terminal UE newly camped.

In step S120, the E-UTRAN relays the TAU Request to the mobility management device MME. The mobility management device MME receives the TAU Request.

In step S130, the mobility management device MME stores the IMSI and the TAI included in the received TAU Request, which are associated with the time information thereby to update the camping history information.

In step S140, the mobility management device MME transmits, to the radio terminal UE via the E-UTRAN, TAU Accept which is a message to the effect that the TAU Request has been received. The radio terminal UE receives the TAU Accept.

When the processes in step S110 to step S140 are repeated, the camping history information is accumulated in the mobility management device MME, and it becomes possible to comprehend a movement pattern (that is, user's behavior pattern) of each radio terminal UE.

In step S150, when it is decided that the Logged MDT is to be implemented for a certain measurement target area or when it is instructed from the operation administration and maintenance device OAM to implement the Logged MDT for a certain measurement target area, the mobility management device MME selects the Logged MDT implementation terminal on the basis of the measurement target area, the camping history information, and the Logged MDT implementation count information. Details of such a terminal selection process will be described later.

In step S160, the mobility management device MME transmits, to the selected Logged MDT implementation terminal via the E-UTRAN, the Idle MDT Configuration for setting the Logged MDT.

In step S170, the mobility management device MME updates the Logged MDT implementation count information. In detail, the mobility management device MME increments (adds one to) the Logged MDT implementation count corresponding to the IMSI of the radio terminal UE to which the Idle MDT Configuration is transmitted, that is, the radio terminal UE that implemented the Logged MDT.

Figure 7:
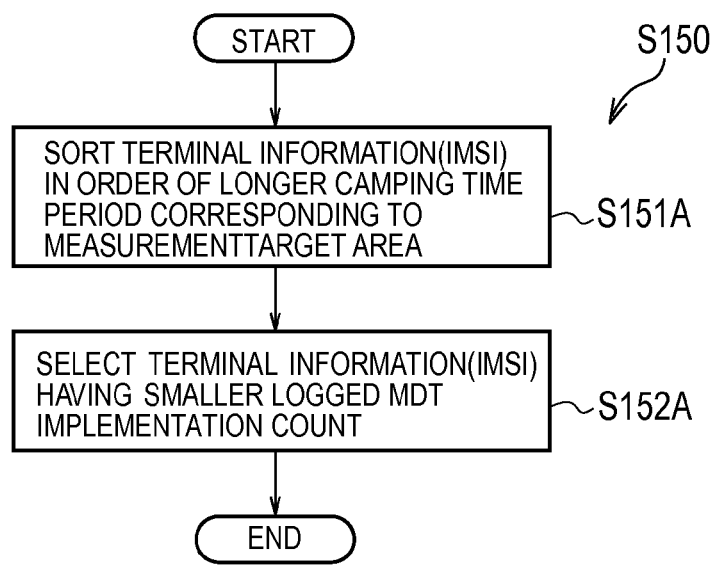
FIG. 7 is a process flowchart of a terminal selection process according to the first embodiment.

FIG. 7 is a process flowchart of the terminal selection process according to the first embodiment, that is, the step S150 in FIG. 6.

As shown in FIG. 7, in step S151A, the control unit 230 of the mobility management device MME evaluates a total camping time period of the TA corresponding to the TAI of the measurement target area, on the basis of the camping history information stored in the storage unit 220, for each IMSI of the plurality of radio terminals A to D, and rearranges (sorts) the IMSIs of the plurality of radio terminals A to D in the order of a longer total camping time period at the measurement target area. That is, the IMSIs of the plurality of radio terminals A to D are rearranged (sorted) in the order of a longer camping time period in the measurement target area in the past.

In step S152A, the control unit 230 of the mobility management device MME selects the Logged MDT implementation terminal on the basis of a list of the sorted IMSIs and the Logged MDT implementation count information stored in the storage unit 220. For example, the radio terminal UE having the IMSI including the smallest corresponding Logged MDT implementation count, out of the upper N of IMSIs on the list of the sorted IMSIs, is selected as the Logged MDT implementation terminal. Alternately, in the order from the highest rank on the list of the sorted IMSIs, whether or not the corresponding Logged MDT implementation count is less than a threshold value is determined, and the radio terminal UE having the IMSI that was determined that the Logged MDT implementation count was less than the threshold value is selected as the Logged MDT implementation terminal.

It is noted that in the process flow, an example in which the measurement target area was designated in a TA unit was described; however, when the measurement target area is designated in a cell unit, a table in which the cell and the TA are corresponded is additionally held, and the TA including the measurement target cell may be regarded as a measurement target area.

FIG. 8 is an operation sequence chart when the Logged MDT is implemented. In this case, an operation of the radio terminal UE after step S160 in FIG. 6 will be mainly described.

As shown in FIG. 8, in step S181, the radio terminal UE receives the Idle MDT Configuration from the E-UTRAN. The radio terminal UE stores each parameter included in the Idle MDT Configuration when receiving the Idle MDT Configuration. These parameters include a measurement target, a measurement trigger, a measurement target area, and a measurement period, as described above. As the measurement target area, a measurement target area that serves as a reference when the Logged MDT implementation terminal is selected is set. Further, the radio terminal UE initiates a timer for measuring a designated measurement period, when the parameter is set.

In step S182, the radio terminal UE transitions from the connected state to the idle state.

In step S183, the radio terminal UE executes the logging (measurement and recording) within the designated measurement period, while the radio terminal UE is in an idle state and camps on the designated measurement target area.

In step S184, the radio terminal UE performs a connection process with the base station eNB included in the E-UTRAN.

In step S185, the radio terminal UE shifts from the idle state to the connection state.

In step S186, the radio terminal UE transmits, to the E-UTRAN, the RRC Connection Setup Complete that is a message indicating that the transition from the idle state to the connected state is completed. At this time, the radio terminal UE includes 1-bit information (Indication) indicating that the measurement data is held into the RRC Connection Setup Complete, and transmits the same.

In step S187, the E-UTRAN transmits, to the radio terminal UE, UE Information Request, which is a message for requesting a transmission of the measurement data held by the radio terminal UE, when it is decided to collect the measurement data.

In step S188, the radio terminal UE transmits, to the E-UTRAN, UE Information Response, which is a message including the held measurement data, in response to the reception of the UE Information Request from the E-UTRAN.

(Effect of the First Embodiment)

As described above, according to the present embodiment, it is possible to select, as the Logged MDT implementation terminal, a radio terminal UE that is highly likely to camp on the measurement target area, that is, a radio terminal UE that is highly likely to be capable of obtaining the measurement data about the measurement target area, on the basis of the camping history information. Therefore, it is possible to effectively collect measurement data in a measurement target area.

Further, according to the present embodiment, it is possible to store (update) the camping history information by utilizing TAU Request, which is one of the existing signalings, and thus, it is possible to prevent the generation of a new signaling (that is, overhead) for storing the camping history information.

Moreover, according to the present embodiment, it is possible to select, as the Logged MDT implementation terminal, a radio terminal UE that has implemented the measurement by the Logged MDT for a small number of times, that is, a radio terminal UE having a relatively low load by the Logged MDT, and thus, it is possible to increase the fairness between the radio terminals UE (between users).

[First Modification of First Embodiment]

The terminal selection process (step S150) according to the above-described first embodiment may be modified as below.

FIG. 9 is a process flowchart of a terminal selection process according to the present modification.

As shown in FIG. 9, in step S151B, the control unit 230 of the mobility management device MME evaluates a total camping time period of the TA corresponding to the TAI of the measurement target area, on the basis of the camping history information stored in the storage unit 220, for each IMSI of the plurality of radio terminals A to D, and selects, as the Logged MDT implementation terminal, a radio terminal UE having the IMSI having the longest total camping time period in the measurement target area.

In step S152B, the control unit 230 of the mobility management device MME decides the measurement period set to the Logged MDT implementation terminal, on the basis of the Logged MDT implementation count information stored in the storage unit 220. In detail, when the Logged MDT implementation count corresponding to the Logged MDT implementation terminal is larger than a predetermined number, setting is made so that the measurement period is shortened than a standard value.

Thus, according to the present modification, when the measurement period for the radio terminal UE that has implemented the Logged MDT for a large number of times, that is, the radio terminal UE having a relatively high load by the Logged MDT, is shortened, it is possible to increase the fairness between the radio terminals UE (between users).

[Second Modification of First Embodiment]

The terminal selection process (step S150) according to the above-described first embodiment may be modified as below.

In the present modification, the mobility management device MME manages Logged MDT implementation period information, instead of the above-described Logged MDT implementation count information. The Logged MDT implementation period information is that in which a period during which the Logged MDT has been implemented is associated with each IMSI of the plurality of radio terminals A to D.

In particular, when a certain radio terminal UE is decided as the Logged MDT implementation terminal and then the Logged MDT is implemented, the control unit 230 of the mobility management device MME associates the above-described period with the IMSI of the radio terminal UE, adds the measurement period set to the radio terminal UE, and then, stores the same. Further, the Logged MDT implementation period is limited in count, and thus, the control unit 230 may preferably delete the Logged MDT implementation period information at a timing at which a certain period (one day or one week) passed or a timing at which the radio terminals UE that implemented the Logged MDT have substantially completed a cycle.

FIG. 10 is a process flowchart of a terminal selection process according to the present modification.

As shown in FIG. 10, a process in step S151C is the same as that in the above-described first embodiment.

In step S152C, the control unit 230 of the mobility management device MME selects the Logged MDT implementation terminal on the basis of a list of the sorted IMSIs and the Logged MDT implementation period information stored in the storage unit 220. For example, the radio terminal UE having the IMSI with the shortest corresponding Logged MDT implementation period, out of the upper N of IMSIs on the list of the sorted IMSIs, is selected as the Logged MDT implementation terminal. Alternately, in the order from the highest rank on the list of the sorted IMSIs, whether or not the corresponding Logged MDT implementation period is less than a threshold value is determined, and the radio terminal UE having the IMSI that was determined that the Logged MDT implementation period was less than the threshold value is selected as the Logged MDT implementation terminal.

Thus, according to the present modification, it is possible to select, as the Logged MDT implementation terminal, a radio terminal UE that has a short period during which the measurement process by the Logged MDT has been implemented, that is, a radio terminal UE having a relatively low load by the Logged MDT, and thus, it is possible to increase the fairness between the radio terminals UE (between users).

[Third Modification of First Embodiment]

The terminal selection process (step S150) according to the above-described first embodiment may be modified as below.

In the present modification, similar to the second modification of the above-described first embodiment, the mobility management device MME manages the Logged MDT implementation period information, instead of the above-described Logged MDT implementation count information.

FIG. 11 is a process flowchart of a terminal selection process according to the present modification.

As shown in FIG. 11, in step S151D, the control unit 230 of the mobility management device MME evaluates a total camping time period of the TA corresponding to the TAI of the measurement target area, on the basis of the camping history information stored in the storage unit 220, for each IMSI of the plurality of radio terminals A to D, and selects, as the Logged MDT implementation terminal, a radio terminal UE having the IMSI having the longest total camping time period in the measurement target area.

In step S152D, the control unit 230 of the mobility management device MME decides the measurement period set to the Logged MDT implementation terminal, on the basis of the Logged MDT implementation period information stored in the storage unit 220. In detail, when the Logged MDT implementation period corresponding to the Logged MDT implementation terminal is longer than a predetermined period, setting is made so that the measurement period is shortened than a standard value.

Thus, according to the present modification, when the measurement period for the radio terminal UE that has a long period during which the measurement process by the Logged MDT has been implemented, that is, the radio terminal UE having a relatively high load by the Logged MDT, is shortened, it is possible to increase the fairness between the radio terminals UE (between users).

[Second Embodiment]

In the above-described first embodiment and the modifications thereof, the selection of the Logged MDT implementation terminal is performed by the mobility management device MME; however, in a second embodiment, the selection of the Logged MDT implementation terminal is performed by the operation administration and maintenance device OAM.

That is, in the present embodiment, the operation administration and maintenance device OAM corresponds to a network device that selects the Logged MDT implementation terminal from among a plurality of radio terminals UE.

In the second embodiment below, a difference from the above-described first embodiment will be mainly described, and a duplicated description will be omitted.

FIG. 12 is a block diagram of the operation administration and maintenance device OAM according to the second embodiment.

As shown in FIG. 12, the operation administration and maintenance device OAM includes a network communication unit 310, a storage unit 320, and a control unit 330.

The network communication unit 310 communicates with the mobility management device MME.

The storage unit 320 is configured by using a memory, for example, and stores various types of information used for control and the like of the operation administration and maintenance device OAM. In the present embodiment, the storage unit 320 stores the Logged MDT implementation count information (see FIG. 5).

The control unit 330 is configured by using a CPU, for example, and controls various types of functions provided in the mobility management device MME. The control unit 330 manages the Logged MDT implementation count information. In detail, when a certain radio terminal UE is decided as the Logged MDT implementation terminal, and then, the Logged MDT is implemented, the control unit 330 increments (adds one to) the Logged MDT implementation count corresponding to the IMSI of the radio terminal UE. Further, the Logged MDT implementation count is limited in count, and thus, the control unit 330 may preferably delete the Logged MDT implementation count information at a timing at which a certain period (one day or one week) passed or a timing at which the radio terminals UE that implemented the Logged MDT have substantially completed a cycle.

When it is decided that the Logged MDT is to be implemented for a certain measurement target area, the control unit 330 selects the Logged MDT implementation terminal on the basis of the measurement target area, the camping history information stored in the mobility management device MME, and the Logged MDT implementation count information stored in the storage unit 320. In particular, the control unit 330 selects, as the Logged MDT implementation terminal, the radio terminal UE which has a relatively long camping time period corresponding to the measurement target area, and which has a relatively small number of times that the Logged MDT has been implemented, out of a plurality of radio terminals A to D.

When the control unit 330 selects the Logged MDT implementation terminal, the control unit 330 instructs the mobility management device MME to transmit, to the Logged MDT implementation terminal, the Idle MDT Configuration for setting the Logged MDT.

Figure 13:
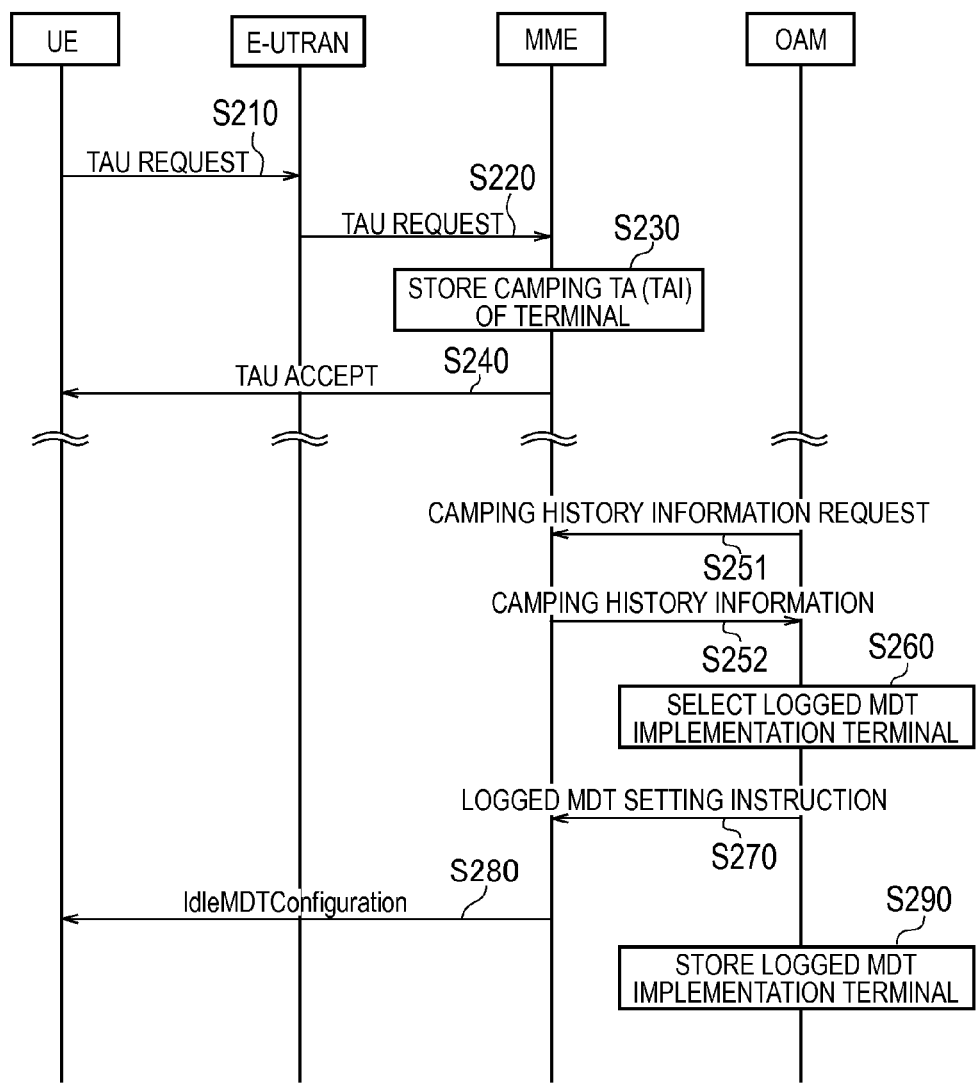
FIG. 13 is an operation sequence chart according to an operation for selecting a Logged MDT implementation terminal in the second embodiment.

FIG. 13 is an operation sequence chart according to an operation for selecting the Logged MDT implementation terminal in the second embodiment.

As shown in FIG. 13, each process of step S210 to step S240 is the same as each process of step S110 to step S140 in the above-described first embodiment.

In step S251, when it is decided to implement the Logged MDT for a certain measurement target area, the operation administration and maintenance device OAM transmits, to one or a plurality of mobility management devices MME, a camping history information request for requesting to transmit the camping history information. The mobility management device MME receives the camping history information request.

In step S252, the mobility management device MME transmits the stored camping history information to the operation administration and maintenance device OAM, in response to the reception of the camping history information request.

In step S260, the operation administration and maintenance device OAM selects the Logged MDT implementation terminal, on the basis of the measurement target area, the camping history information received from the mobility management device MME, and the Logged MDT implementation count information stored in the storage unit 320. Such a terminal selection process is the same process procedure as the terminal selection process according to the first embodiment and the modifications thereof, and thus, the description will be omitted.

In step S270, the operation administration and maintenance device OAM transmits, to the mobility management device MME, a Logged MDT setting instruction for instructing the selected Logged MDT implementation terminal to set the Logged MDT. The Logged MDT setting instruction includes the IMSI of the selected Logged MDT implementation terminal and information for designating each parameter (such as the measurement target area) of the Logged MDT.

In step S280, the mobility management device MME transmits, to the Logged MDT implementation terminal via the E-UTRAN, the Idle MDT Configuration for setting the Logged MDT, in response to the Logged MDT setting instruction received from the operation administration and maintenance device OAM.

In step S290, the operation administration and maintenance device OAM updates the Logged MDT implementation count information. In detail, the operation administration and maintenance device OAM increments (adds one to) the Logged MDT implementation count corresponding to the IMSI of the radio terminal UE to which the Idle MDT Configuration is transmitted, that is, the radio terminal UE that implemented the Logged MDT.

It is noted that an operation sequence when the Logged MDT is implemented is the same as that in the above-described first embodiment.

As described above, according to the present embodiment, when the selection of the Logged MDT implementation terminal is performed by the operation administration and maintenance device OAM, even when the radio terminal UE moves over a wide range across the base stations eNB subordinate to each of a plurality of mobility management devices MME, it is possible to appropriately select the Logged MDT implementation terminal.

[Third Embodiment]

In the above-described first embodiment and the modifications thereof, the camping history information is stored in the mobility management device MME; however, in the present embodiment, the camping history information is stored in each radio terminal UE.

In the present embodiment, the selection of the Logged MDT implementation terminal is performed by the mobility management device MME, similarly to the first embodiment. However, similarly to the above-described second embodiment, the selection of the Logged MDT implementation terminal may be performed by the operation administration and maintenance device OAM.

In a third embodiment below, a difference from the above-described first embodiment will be mainly described, and a duplicated description will be omitted.

Figure 14:
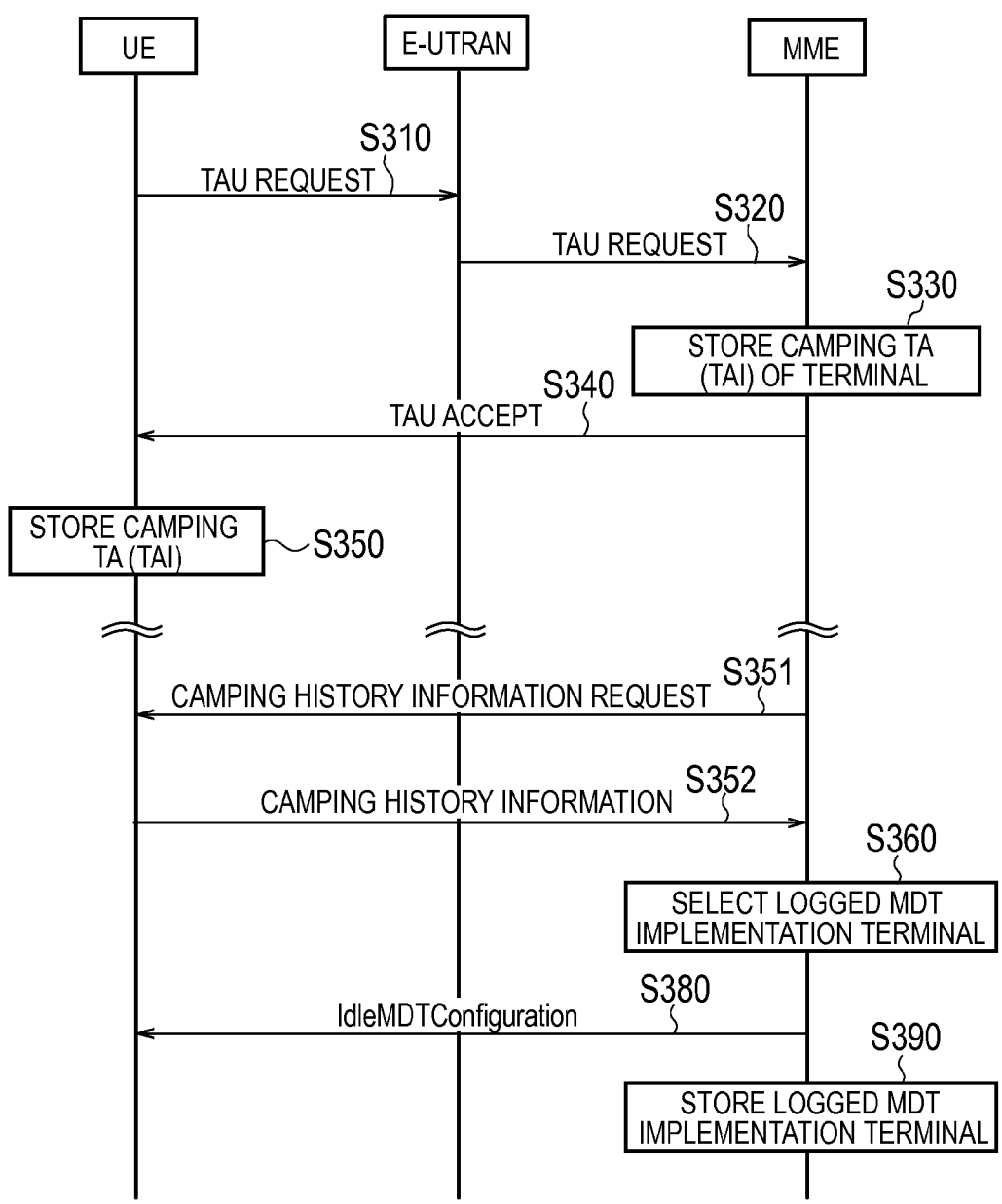
FIG. 14 is an operation sequence chart according to an operation for selecting a Logged MDT implementation terminal in the third embodiment.

FIG. 14 is an operation sequence chart according to an operation for selecting the Logged MDT implementation terminal in the third embodiment.

As shown in FIG. 14, each process in step S310 and step S320 is the same as each process in the above-described step S110 and step S120.

In step S330, the mobility management device MME stores the IMSI and the TAI included in the received TAU Request, in a corresponding manner.

In step S340, the mobility management device MME transmits, to the radio terminal UE via the E-UTRAN, the TAU Accept which is a message to that effect that the TAU Request has been received. The radio terminal UE receives the TAU Accept.

In step S350, the radio terminal UE stores the IMSI and the TAI included in the transmitted TAU Request, which are associated with the time information, thereby to update the camping history information stored in the radio terminal UE. It is noted that the camping history information according to the present embodiment may not only be managed in a TA unit but also managed in a cell unit as in the first embodiment.

When the processes in step S310 to step S350 are repeated, the camping history information is accumulated in each radio terminal UE, and it becomes possible to comprehend a movement pattern (that is, user's behavior pattern) of each radio terminal UE.

In step S351, when it is decided that the Logged MDT is to be implemented for a certain measurement target area or when it is instructed from the operation administration and maintenance device OAM to implement the Logged MDT for a certain measurement target area, the mobility management device MME transmits the camping history information request which is a message for requesting a transmission of the camping history information, to each radio terminal UE, via the E-UTRAN.

In step S352, each radio terminal UE that received the camping history information request transmits the camping history information stored in the radio terminal UE to the mobility management device MME, via the E-UTRAN. The mobility management device MME receives the camping history information from each radio terminal UE.

In step S360, the mobility management device MME selects the Logged MDT implementation terminal on the basis of the measurement target area, the camping history information collected from each radio terminal UE, and the Logged MDT implementation count information managed by the mobility management device MME. Such a terminal selection process is the same process procedure as the terminal selection process according to the first embodiment and the modifications thereof, and thus, the description will be omitted. It is noted that in the present embodiment, when the radio terminal UE manages the camping history information in a cell unit, the measurement target area may be designated in a cell unit.

In step S380, the mobility management device MME transmits, to the Logged MDT implementation terminal, the Idle MDT Configuration for setting the Logged MDT via the E-UTRAN.

In step S390, the mobility management device MME updates the Logged MDT implementation count information. In detail, the mobility management device MME increments (adds one to) the Logged MDT implementation count corresponding to the IMSI of the radio terminal UE to which the Idle MDT Configuration is transmitted, that is, the radio terminal UE that implemented the Logged MDT.

It is noted that an operation sequence when the Logged MDT is implemented is the same as that in the above-described first embodiment.

As described above, according to the present embodiment, when the camping history information is stored at the radio terminal UE side, it is possible to reduce a load at the network side. Further, as compared to a case where the camping history information is stored at the network side, it is possible to store the camping history information in a more minute area unit such as a cell unit, for example.

[Other Embodiments]

Thus, the present invention has been described with the embodiments. However, it should not be understood that those descriptions and drawings constituting a part of this disclosure limit the present invention. From this disclosure, a variety of alternate embodiments, examples, and applicable techniques will become apparent to one skilled in the art.

For example, in each of the above-described embodiments, an example of a mobile communication system configured on the basis of LTE, standards of which have been designed in the 3GPP, is described. However, in addition to LTE, the present invention may be applied to another mobile communication system such as W-CDMA (Wideband Code Division Multiple Access).

In addition, the entire content of Japanese Patent Application No. 2011-136823 (filed on Jun. 20, 2011) is incorporated in the present specification by reference.

INDUSTRIAL APPLICABILITY

As described above, the present invention can appropriately select a radio terminal that should implement a measurement process by MDT, and thus, the present invention is useful in a radio communication field such as a mobile communication.

The invention claimed is:

1. A terminal selection method in which a network device selects a measurement implementation terminal that should implement a measurement process by Minimization of Drive Test (MDT), from among a plurality of radio terminals, in a mobile communication system compatible with the MDT defined in the 3rd Generation Partnership Project (3GPP) standards, the method comprising:
a storage step of storing camping history information in which information indicating an area on which the radio terminal has camped is associated with information indicating a time period during which the radio terminal has camped on the area, in each of the plurality of radio terminals;
a collection step of collecting, by the network device, the camping history information stored in each of the plurality of radio terminals when it is decided that MDT is to be implemented for a certain measurement target area; and
a selection step of selecting, on the basis of the camping history information collected in the collection step, as the measurement implementation terminal, a radio terminal having a relatively long camping time period corresponding to the measurement target area on which the measurement process is to be performed, from among the plurality of radio terminals.

2. The terminal selection method according to claim 1, further comprising:
a management step of managing the number of times that the measurement process has been implemented, for each of the plurality of radio terminals, wherein
in the selection step, a radio terminal which has a relatively long camping time period corresponding to the measurement target area and which has a relatively small number of times that the measurement process has been implemented, from among the plurality of radio terminals, is selected as the measurement implementation terminal, on the basis of the camping history information collected in the collection step and information managed in the management step.

3. The terminal selection method according to claim 1, further comprising:
a management step of managing a period during which the measurement process has been implemented, for each of the plurality of radio terminals, wherein
in the selection step, a radio terminal which has a relatively long camping time period corresponding to the measurement target area and which has a relatively short period during which the measurement process has been implemented, from among the plurality of radio terminals, is selected as the measurement implementation terminal, on the basis of the camping history information collected in the collection step and information managed in the management step.

4. The terminal selection method according to claim 1, further comprising:
a management step of managing the number of times that the measurement process has been implemented, for each of the plurality of radio terminals; and
a setting step of setting a period during which the measurement process should be implemented to the measurement implementation terminal selected in the selection step, on the basis of information managed in the management step, wherein
in the setting step, when the number of times that the measurement implementation terminal selected in the selection step has implemented the measurement process is large, the period during which the measurement process should be implemented is set to be shortened.

5. The terminal selection method according to claim 1, further comprising:
a management step of managing a period during which the measurement process has been implemented, for each of the plurality of radio terminals; and
a setting step of setting a period during which the measurement process should be implemented to the measurement implementation terminal selected in the selection step, on the basis of information managed in the management step, wherein
in the setting step, when the period during which the measurement implementation terminal selected in the selection step has implemented the measurement process is longer than a predetermined period, the period during which the measurement process should be implemented is set to be shortened.

6. A network device that selects a measurement implementation terminal that should implement a measurement process by Minimization of Drive Test (MDT), from among a plurality of radio terminals, in a mobile communication system compatible with the MDT defined in the 3rd Generation Partnership Project (3GPP) standards, the network device comprising:
a collection unit configured to collect camping history information stored in each of the plurality of radio terminals when it is decided that MDT is to be implemented for a certain measurement target area, wherein the camping history information associates information indicating an area on which the radio terminal has camped for each of the plurality of radio terminals with information indicating a time period during which the radio terminal has camped on the area; and a controller configured to select, as the measurement implementation terminal, a radio terminal having a relatively long camping time period corresponding to the measurement target area on which the measurement process is to be performed, from among the plurality of radio terminals, on the basis of the camping history information collected by the collection unit.

* * * * *